US009307182B2

(12) United States Patent
Lee

(10) Patent No.: US 9,307,182 B2
(45) Date of Patent: Apr. 5, 2016

(54) DISPLAY DEVICE WITH FORCE DISPERSAL STRUCTURE

(71) Applicant: AU Optronics Corporation, Hsin-Chu (TW)

(72) Inventor: Keng-Yi Lee, Hsin-Chu (TW)

(73) Assignee: AU OPTRONICS CORPORATION, Hisn-Chu (TW)

( * ) Notice: Subject to any disclaimer, the term of this patent is extended or adjusted under 35 U.S.C. 154(b) by 63 days.

(21) Appl. No.: 14/302,475

(22) Filed: Jun. 12, 2014

(65) Prior Publication Data

US 2015/0085430 A1 Mar. 26, 2015

(30) Foreign Application Priority Data

Sep. 24, 2013 (TW) .............................. 102134266 A

(51) Int. Cl.
*G06F 1/16* (2006.01)
*H04N 5/64* (2006.01)
*G02F 1/1333* (2006.01)

(52) U.S. Cl.
CPC ............ *H04N 5/64* (2013.01); *G02F 1/133308* (2013.01); *G06F 1/16* (2013.01); *G02F 2001/13332* (2013.01); *G02F 2001/133314* (2013.01); *G02F 2201/46* (2013.01)

(58) Field of Classification Search
CPC combination set(s) only.
See application file for complete search history.

(56) References Cited

U.S. PATENT DOCUMENTS 5,831,816 A * 11/1998 Johns ..................... F16M 11/10
349/60
7,304,837 B2 * 12/2007 Lo .......................... G06F 1/1601
248/313
8,243,224 B2 * 8/2012 Kameoka .............. G06F 1/1601
348/766
8,797,729 B2 * 8/2014 Mukaide .................. H04N 5/64
349/58

(Continued)

FOREIGN PATENT DOCUMENTS

CN 101501557 A 8/2009
JP 06138443 5/1994

(Continued)

OTHER PUBLICATIONS

Office Action from related China application (No. 201310548326.3) dated Feb. 16, 2015.
English Abstract translation of JP06138443 (Published May 20, 1994).
English Abstract translation of JP10253949 (Published Sep. 25, 1998).

*Primary Examiner* — Lisa Lea Edmonds
(74) *Attorney, Agent, or Firm* — McClure, Qualey & Rodack, LLP

(57) ABSTRACT

A display device includes a housing, a display module, and a force dispersal member. The housing has a top plate and a bottom plate, wherein the top plate has a top plate inner surface and the bottom plate has a bottom plate inner surface. The display module is disposed on the bottom plate and at least a portion thereof is covered by the top plate. The display module includes a body and a ledge, wherein the body has a corresponding top surface and a back surface. At least a portion of the top surface faces the top plate inner surface while the back surface faces the bottom plate inner surface. The ledge extends out from an end of the body and is positioned between the top plate and the bottom plate. The force dispersal member is disposed on the ledge and has a top end and a bottom end. The top end faces the top plate inner surface and the bottom end faces the bottom plate inner surface. A vertical distance from the bottom end to the bottom plate inner surface is no greater than the vertical distance between the back surface and the bottom plate inner surface.

16 Claims, 9 Drawing Sheets

(56) References Cited

U.S. PATENT DOCUMENTS

| | | | |
|---|---|---|---|
| 2007/0064378 A1* | 3/2007 | Lo | G02F 1/133308 361/679.22 |
| 2009/0290089 A1 | 11/2009 | Ichioka et al. | |
| 2011/0116217 A1* | 5/2011 | Lee | H05K 5/0217 361/679.01 |
| 2012/0099044 A1 | 4/2012 | Lin et al. | |
| 2012/0250185 A1* | 10/2012 | Ishikawa | G06F 1/1601 360/99.08 |
| 2013/0201413 A1* | 8/2013 | Nakase | H05K 5/02 348/836 |
| 2013/0235277 A1* | 9/2013 | Suwa | H04N 5/64 348/725 |
| 2013/0265505 A1* | 10/2013 | Hirofumi | H04N 5/642 348/843 |
| 2014/0347567 A1* | 11/2014 | Ito | H04N 5/64 348/791 |
| 2015/0185538 A1* | 7/2015 | Yamamichi | H04N 5/64 349/60 |

FOREIGN PATENT DOCUMENTS

| | | |
|---|---|---|
| JP | 10253949 | 9/1998 |
| JP | 3385309 | 1/2000 |
| TW | 201217857 A1 | 5/2012 |

* cited by examiner

DISPLAY DEVICE WITH FORCE DISPERSAL STRUCTURE

BACKGROUND

1. Technical Field

The present disclosure generally relates to a display device; particularly, the present disclosure relates to a display device that has a structure for dispersing external forces.

2. Description of the Related Art

Along with advancements in science of technology, the technology of flat panel displays are also continually improving. In order to meet product needs, research and development have been trending towards providing improvements in the areas of increased display area, narrower frames, slimmer modules, and display effects. However, along with optimization of the above displays, the structural strength capabilities of the displays to withstand external forces will be severely tested.

In terms of the conventional displays, as seen in FIG. 1, the displays usually include a top housing 10, a bottom housing 20, and a display module 30. The display module 30 is sandwiched between the top housing 10 and the bottom housing 20, wherein the display module 30 is cooperatively being positioned by the top housing 10 and the bottom housing 20. However, when the display sustains a force, the external force is transferred to the display module 30 through the contact between the display module 30 and the top housing 10 or the bottom housing 20 irrespective of whether or not the external force originates from the top housing 10 or the bottom housing 20. Since the inner portion of the display module 30 may have relatively weaker or brittle spots, these spots would easily turn into points of focus for the external force and consequently cause the structure to prematurely fail.

SUMMARY

It is an object of the present disclosure to provide a display device that can decrease chances of damage resulting from external forces.

It is another object of the present disclosure to provide a display device having a dispersion member that can disperse external forces to decrease damages to the display panel.

The display device includes a housing, a display module, and a force dispersal member. The housing has a top plate and a bottom plate, wherein the top plate has a top plate inner surface and the bottom plate has a bottom plate inner surface facing the top plate inner surface. The display module is disposed on the bottom plate and partially covered by the top plate. The display module includes a body and a ledge, wherein the body has corresponding top surface and back surface. At least a portion of the top surface is facing the top plate inner surface, while the back surface faces the bottom inner surface. The ledge extends out from an end of the body and positioned between the top plate and the bottom plate. The force dispersal member is disposed on the ledge and has a top end and a bottom end, wherein the top end faces the top plate inner surface and the bottom end faces the bottom plate inner surface. A vertical distance between the bottom end to the bottom plate inner surface is not greater than the vertical distance between the back surface and the bottom plate inner surface.

Through the above design, when an external force is applied to the housing, such as a collision, the force dispersal member may be utilized as a conduit between the top plate and the bottom plate to disperse the external force from the top plate to the bottom plate or vice versa. In this manner, a force dispersion effect may be generated to avoid allowing the external force to be concentrated on a particular point on the display module and cause damage thereto.

DETAILED DESCRIPTION OF THE PREFERRED EMBODIMENT

The present disclosure provides a display device assembled from a body and a display module disposed within the body. In the embodiment, the display module includes a liquid crystal display module, an organic light-emitting diode display module, an electrophoretic display module, a reflective liquid crystal display module, or any other related display modules.

Figure 1:
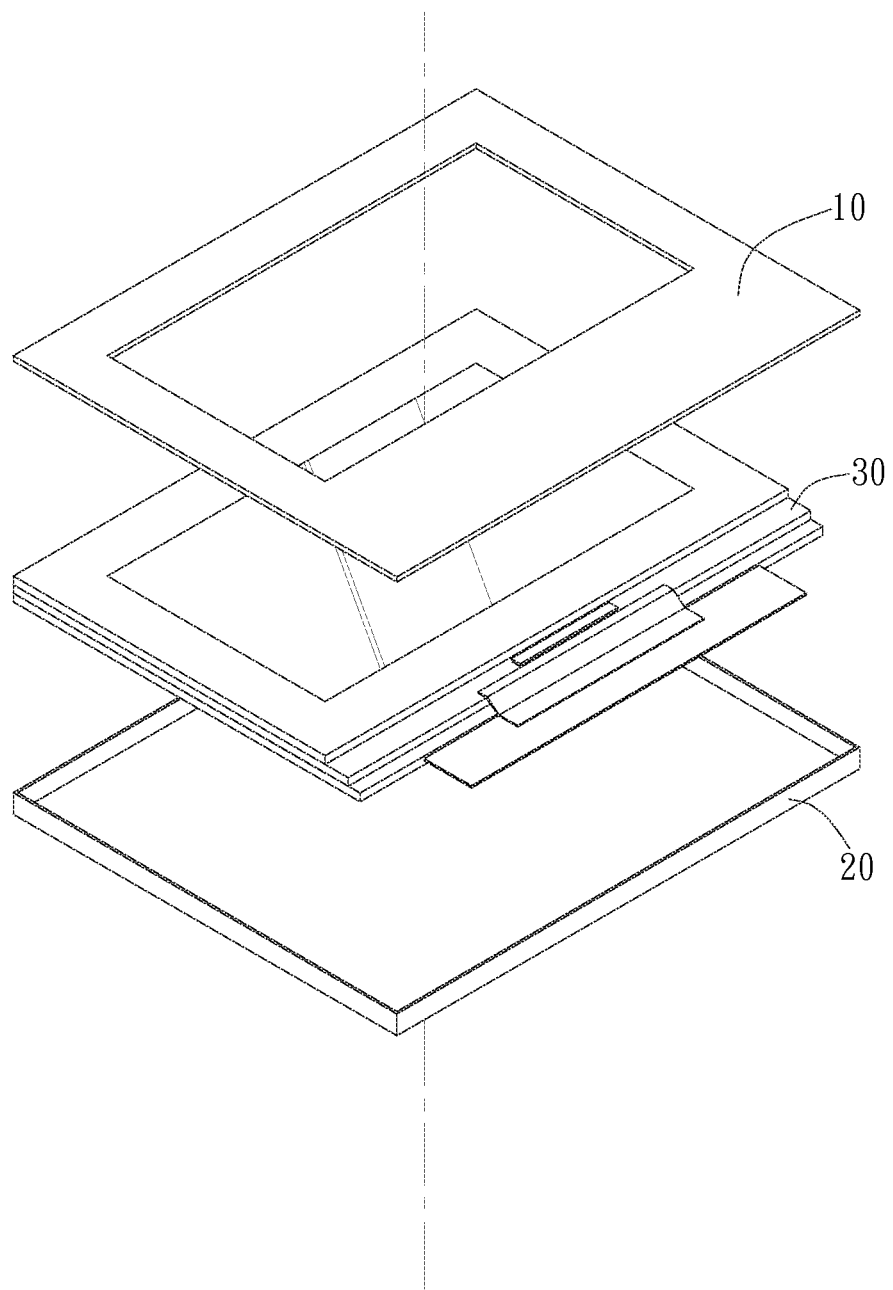
FIG. 1 is a view of the conventional display device.
Figure 2A:
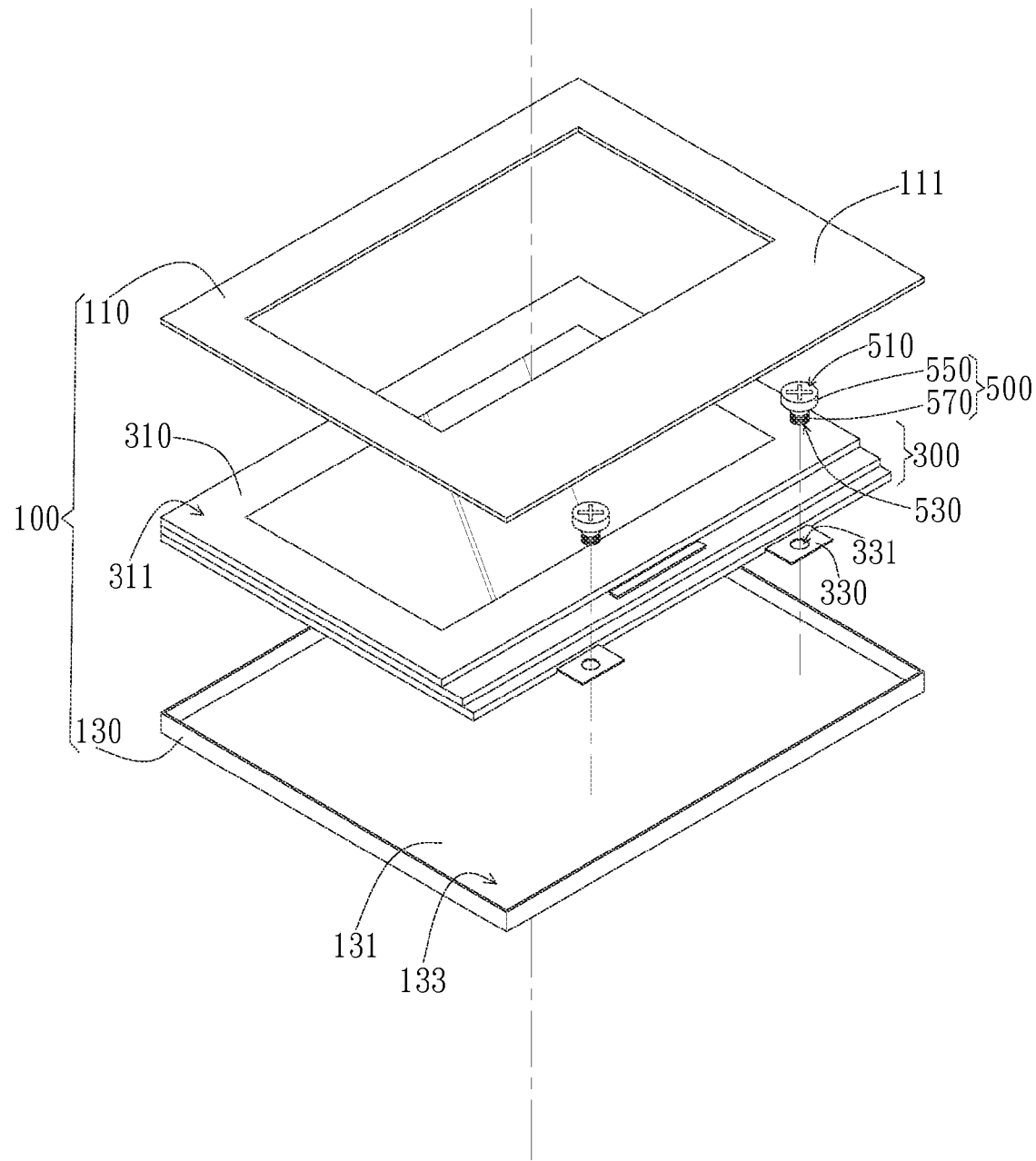
FIG. 2A is an exploded view of a display device of the present invention.
Figure 2B:
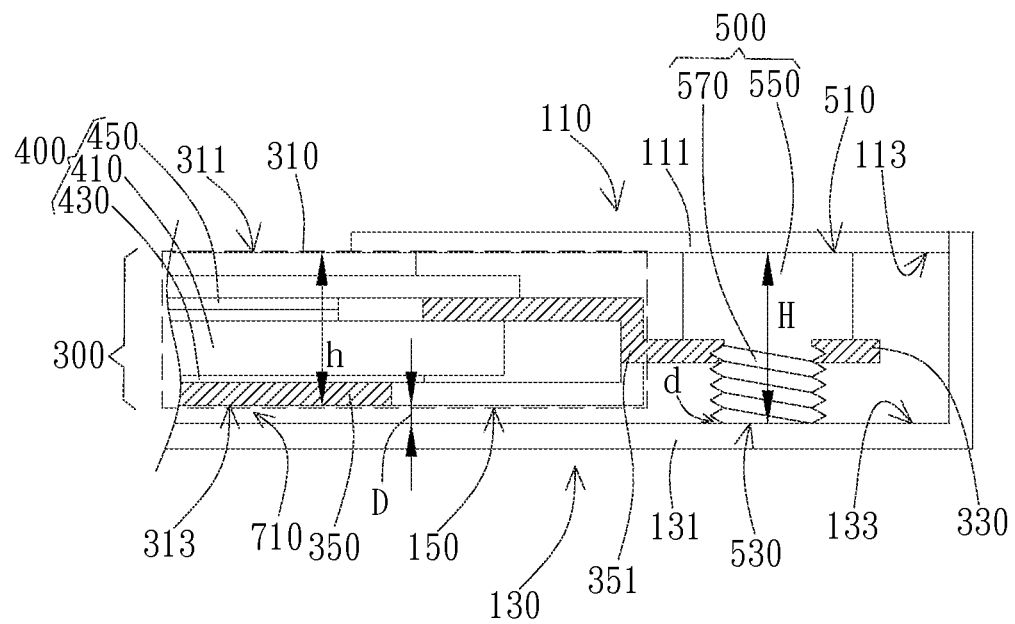
FIG. 2B is a cross-sectional view of the display device of FIG. 2A.

As illustrated in FIGS. 2A and 2B, the display device includes a housing 100, a display module 300, and a force dispersal member 500. In the embodiment, the housing 100 includes a front housing 110 and a back housing 130 sandwiching an accommodating area 150 to accommodate the display module 300, as shown in FIG. 2B. In details, the front housing 110 is positioned on a side of the image display of the display module 300 and is formed as a frame structure having a window to allow the display module 300 to display images out through the window. The front housing 110 has a top plate 111, wherein the top plate 111 is formed as said frame structure's side edges or trim. The top plate 111 covers a portion area of the display module 300; particularly covering the non-display areas. Referring to FIG. 2B, the top plate 111 has a top plate inner surface 113 facing the display module 300, but also has a portion protruding outside of the display module 300. In other words, a portion area of the top plate 111 will have an overlapping area with the display module 300 on the vertical direction, and another portion area of the top plate 111 will not be overlapping with the display module 300 on the vertical direction. The back housing 130 is positioned on a backside of the display module 300 opposite the direction of the image display and corresponds to the front housing 110. The back housing 130 has a bottom plate 131 positioned on the backside of the display module 300, wherein the bottom plate 131 has a bottom plate inner surface 133 facing the top plate inner surface 113. From another perspective, the display module 300 is supported by the bottom plate 131 and a portion of the display module 300 extends into and between the bottom plate 131 and the top plate 111. Alternatively to the front housing 110 being assembled together with the back housing 130, in other embodiments, they are integrally formed as a singular piece. No limitations on the formation of the front housing 110 and the back housing 130 are implied herein.

As illustrated in FIGS. 2A and 2B, the display module 300 is disposed on the bottom plate 131 and at least partially covered by the top plate 111. The display module 300 includes a body 310 and a ledge 330. The body 310 has corresponding top surface 311 and back surface 313. At least a portion of the top surface 311 is facing the top plate inner surface 113, while the back surface 313 is facing the bottom plate inner surface 133. In terms of liquid crystal display module 300 as an example, the top surface 311 is the external surface provided for displaying images by the display panel, while the back surface 313 is the bottom surface of the backlight module. However, in terms of self-luminous types of display modules 300, the back surface 313 is the substrate bottom surface of the display panel itself.

As shown in FIG. 2B, a first gap 710 is between the back surface 313 of the body 310 and the bottom plate inner surface 133. In an embodiment, the first gap 710 is between 0.5 mm to 1.5 mm in order to provide a suitable buffer space between the display module 300 and the housing 100. The body 310 is connected to a side of the housing 100 to accomplish the making of the first gap 710 between the back surface 313 and the bottom plate inner surface 133. The first gap 710 is maintained as an air layer. However, in other embodiment, the first gap 710 is also filled with a filler material according to the structural stability or heat dissipation requirements, wherein the elasticity of the filler material is greater than the structural body of the housing 100 and the back surface 313 to ensure that the filler material deforms before the housing 100 deforms. In addition, a portion of the top surface 311 of the body 310 will extend into and between the top plate inner surface 113 and the bottom plate inner surface 133. In other words, a portion of the top surface 311 will overlap with the top plate inner surface 113. The top surface 311 is in contact against the top plate inner surface 113. However, in other different embodiments, there are a gap between the top surface 311 and the top plate inner surface 113.

As shown in FIG. 2B, the ledge 330 extends out from an end of the body 310 and is positioned between the top plate 111 and the bottom plate 131. In an embodiment, the body 310 includes an outer frame 350, wherein the ledge 330 extends outwards from the outer frame 350 and the extending direction is parallel to the top surface 311 or the back surface 313. The ledge 330 is formed from bending of the plate member of the outer frame 350, wherein a through hole 331 exists to provide a place into which the force dispersal member 500 is disposed, as illustrated in FIG. 2A. The body 310 includes a backlight module 400 surrounded by the outer frame 350, wherein the backlight module 400 includes a light-guide plate 410, a reflective sheet 430, and an optical film 450, or any other related element.

As illustrated in FIGS. 2A and 2B, the force dispersal member 500 is fixed or screwed onto the ledge 330, and the force dispersal member 500 is locked into the ledge 330 by penetrating the force dispersal member 500 through the through hole 331. The force dispersal member 500 employs a rod-shaped design having a top end 510 and a bottom end 530. A vertical distance d from the bottom end 530 to the bottom plate inner surface 133 is not greater than a vertical distance D between the back surface 313 and the bottom plate inner surface 133. In the present embodiment, the top end 510 and the bottom end 530 are respectively contacting against the top plate inner surface 113 and the bottom plate inner surface 133. Therefore, the vertical distance d from the bottom end 530 to the bottom plate inner surface 113 is 0. Force dispersal member 500 includes a protrusion portion 550 and a rod portion 570. The rod portion 570 is connected beneath the protrusion portion 550, wherein the protrusion portion 550 contacts against the top plate inner surface 113 and the rod portion 570 penetrates through the through hole 331 of the ledge 330 to contact against the bottom plate inner surface 133. Since the diameter of the rod portion 570 is smaller than the width of the protrusion portion 550 in the same direction, when the rod portion 570 is formed as a screw, the structure of the force dispersal member 500 will be related to a bolt. In addition, a vertical distance H between the top end 510 and the bottom end 530 is greater than a vertical distance h between the top surface 311 and the back surface 313. In this manner, when an external force is sustained, the bottom plate inner surface 133 will more easily come in contact with the bottom end 530 to disperse the external force before coming in contact with the back surface 313.

Through the above mentioned design, when an external force such as a collision is applied to the housing 100, the external force is transmitted through the conduction channel or transfer conduit established by the force dispersal member 500 between the top plate 111 and the bottom plate 131, thereby transferring the force to the other plate no matter which of the top plate 111 or the bottom plate 131 the external force is originally applied on. In this manner, the effect of force dispersion is realized to prevent forces from being concentrated on the display module 300 and causing damage. In addition, since the display module 300 has a reasonable amount of displacement freedom between the top plate 111 and the bottom plate 131, the housing 100 will at most only directly spur or indirectly through the ledge 330 spur displacement of the display module 300 when an external force is applied to the housing 100. The display module 300 will not easily be deformed since the display module 300 will be displaced. In other words, the display module 300 is not be a force conduit between the top plate 111 and the bottom plate 131, or is only transfer a very small amount of force. Therefore, a majority of the external force is conducted through the force dispersal member 500, decreasing the chance of the external force being concentrated on the display module 300.

Figure 3A:
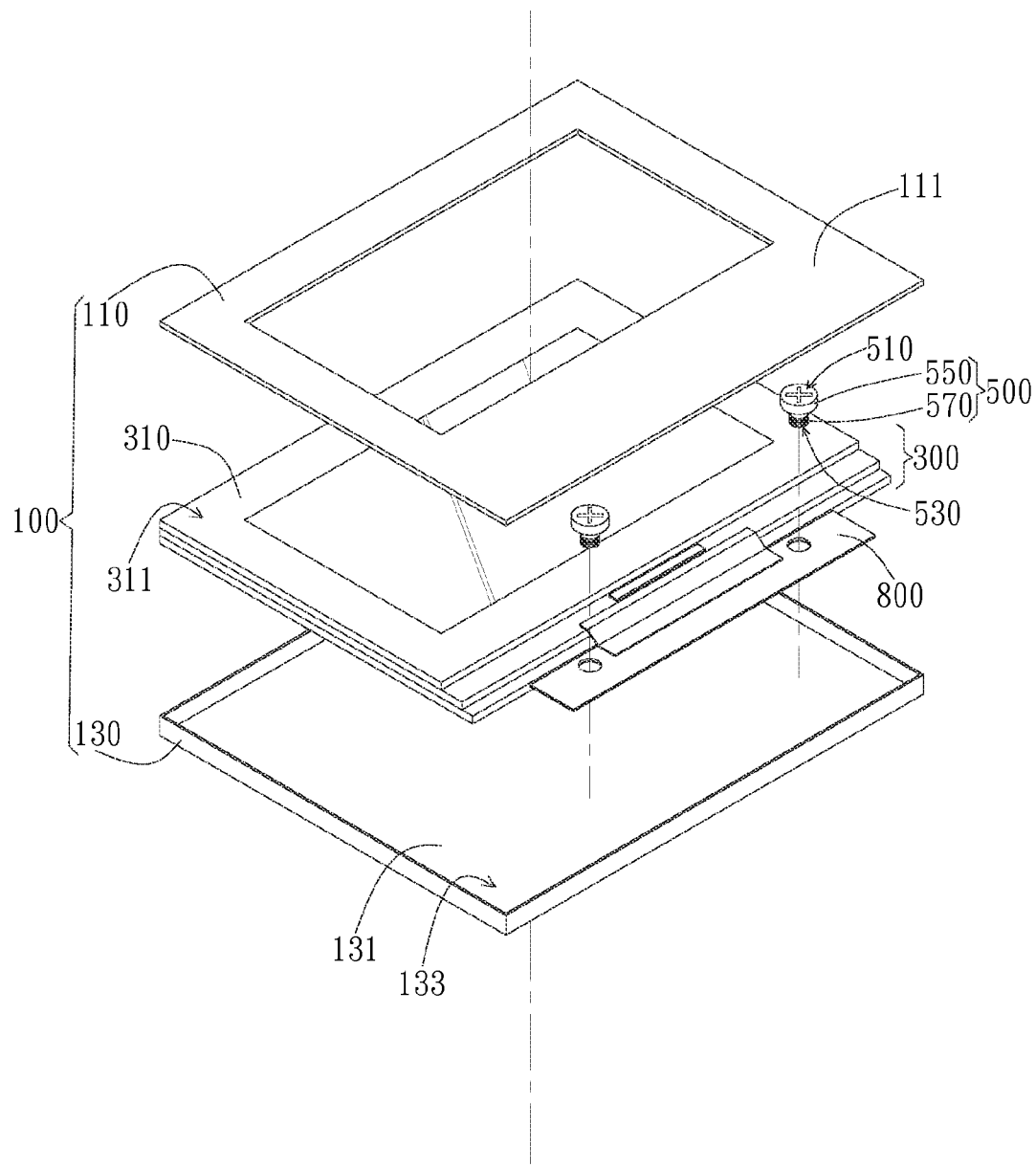
FIG. 3A is an exploded view of another embodiment of the display device.
Figure 3B:
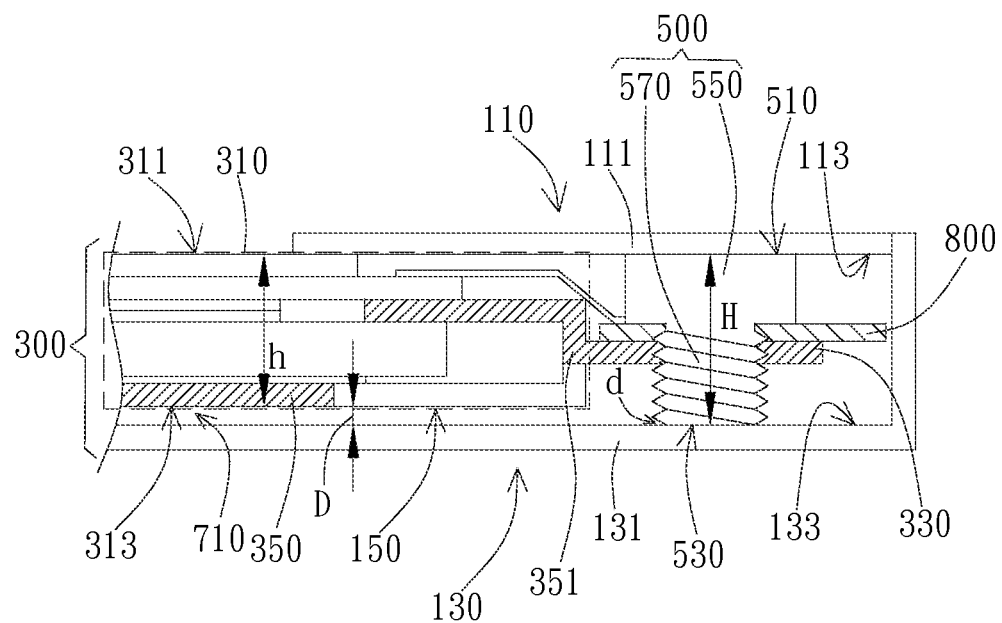
FIG. 3B is a cross-sectional view of the display device of FIG. 3A.
Figure 4:
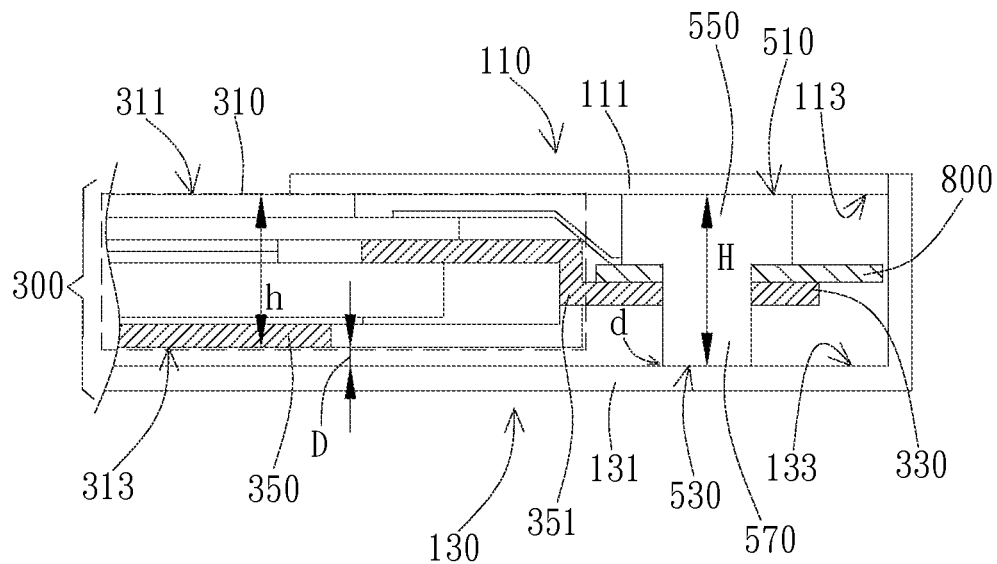
FIG. 4 is another embodiment utilizing a different force dispersal member.

As illustrated in the embodiments shown in FIGS. 3A and 3B, a circuit board 800 is further included and disposed between the top plate 111 and the bottom plate 131. The circuit board 800 is a system circuit or driver circuit of the display module 300, wherein the circuit board 800 can be a printed circuit board or a flexible circuit board connected with the display module 300. The force dispersal member 500 fixes the circuit board 800 onto the ledge 330 to prevent the circuit board 800 from rocking or shaking within the housing 100. As shown in FIGS. 3A and 3B, the rod portion 570 passes through the circuit board 800 and the through hole 331, while the protrusion portion 550 overlays on the circuit board 800 to constrict the circuit board 800 onto the ledge 330. In the present embodiment, the rod portion 570 is a screw, wherein the material thereof is metallic or a polymer, but it's not limited to. The rod portion 570 screws into the inner threads of the through hole 331. However, in embodiments such as FIG. 4, the rod portion 570 also doesn't possess threads, wherein the rod portion 570 is adhered within the through hole 331 by way of tightly fitting the rod portion 570 into the through hole 331. In the present embodiment, the force dispersal member 500 is manufactured from a plastic based material, and it results to provide the deforming properties necessary to allow close fitting when the rod portion 570 presses into the through hole 331.

Figure 5:
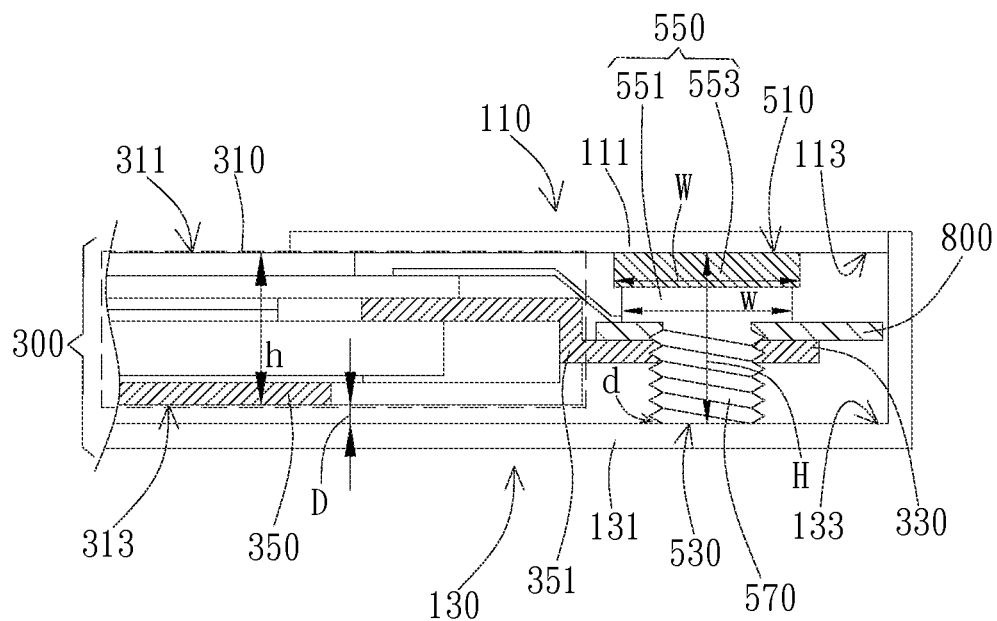
FIG. 5 is another embodiment utilizing a different force dispersal member.

FIG. 5 illustrates another embodiment. In the present embodiment, the protrusion portion 550 includes a substrate 551 and a contact layer 553. A bottom portion of the substrate 551 connects with the rod portion 570, while the contact layer 553 is disposed on the substrate 551 and contacts against the top plate inner surface 113. The substrate 551 and the rod portion 570 are integrally formed and connected as one piece, while the contact layer 553 is an additional piece disposed onto the substrate 551. The width W of the contact layer 553 in the direction of the diameter of the rod portion 570 is greater or equal than the width w of the substrate 551 in order to increase the contact area between the force dispersal member 500 and the top plate inner surface 113. The widths W and w herein mentioned preferably refers to the greatest distance between any two boundary points in the cross-section of the rod portion 570 which is perpendicular to the direction of the axis of the rod portion 570. In other words, when the contact layer 553 is a disc shape, the width W is the diameter of the disc. This design can increase the chance that the external force above the top plate 111 is dispersed onto the bottom plate 131 through the force dispersal member 500. In addition, the contact layer 553 uses a material more flexible or elastic than the substrate 551 in order to generate a preliminary buffer effect for bearing or sustaining a larger external force.

Figure 6:
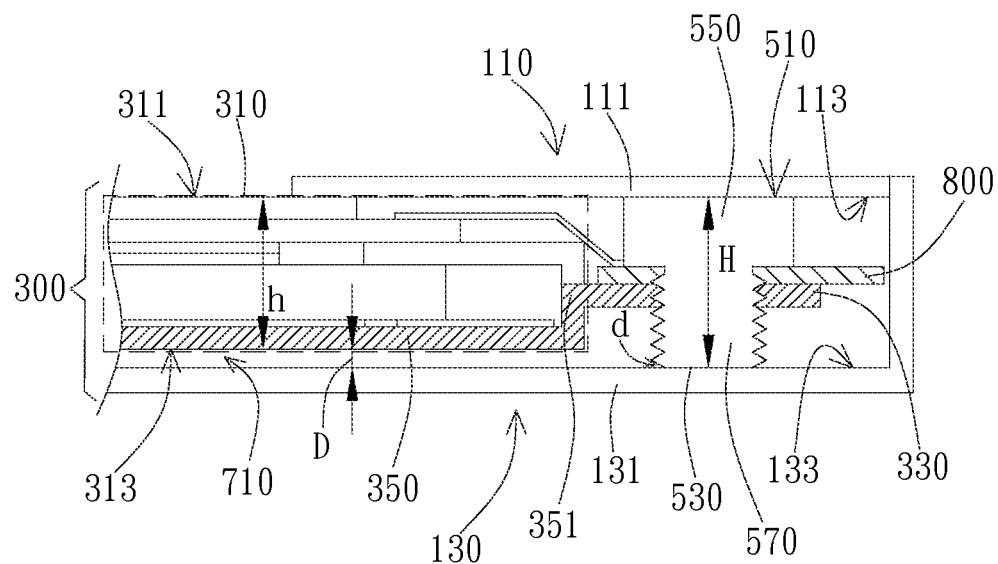
FIG. 6 is another embodiment with a different ledge design.

In the previous embodiment, as illustrated in FIGS. 2A to 5, the ledge 330 is folded up from the bottom portion of the outer frame 350 and then extends outward from the side wall 351 of the outer frame 350. Under these circumstances, the top surface 311 of the body 310 is relatively weaker. In this instance, it results to complement the contacting against between the protrusion portion 550 and the top plate inner surface 113 to increase the ability to absorb the external force from the top plate 111 in order to decrease the chances of the top surface 311 of the body 310 from sustaining damage. In other words, as illustrated in the embodiment shown in FIG. 6, the ledge 330 is formed directly from folding the outer frame 350 outward from the sidewall 351. Under these circumstances, the back surface 313 of the body 310 will be relatively weaker. In this instance, it results to complementary invert the force dispersal member 500 to allow the protrusion portion 550 to contact the bottom plate inner surface 133 in order to increase the ability to absorb the external force on the bottom plate 131 and decrease the likelihood of the back surface 313 of the body 310 from sustaining damage.

Figure 7:
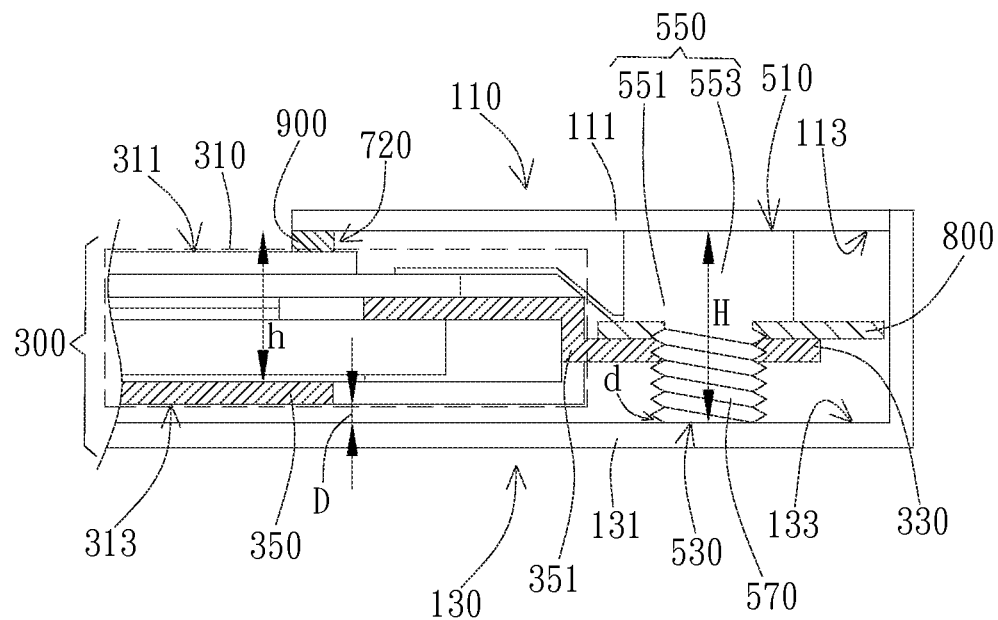
FIG. 7 is a cross-sectional view of another embodiment of the display device.

In the previous embodiment, a top end 510 of the force dispersal member 500 is flush with the top surface 311 of the body 310, wherein the distance between the two and the top plate inner surface 113 is the same. In other words, the protrusion portion has a specific thickness that is no smaller than the gap between ledge 330 or circuit board 800 to the top surface 311 of the body 310. However, in other different embodiments, the top end 510 is also closer to the top plate inner surface 113 than the top surface 311. As shown in FIG. 7, on a direction perpendicular to the normal line of the top plate inner surface 113, the top end 510 protrudes out of the horizontal level of the top surface 311. In other words, it protrudes out of the horizontal surface of the top surface 311. The top end 510 jacks up or supports the top plate 111, and a second gap 720 is between the overlaying portions of the top plate inner surface 113 and the top surface 311. Through this design, the force sustained by the top plate 111 will not easily be conducted to the top surface 311 through the contact. Instead, the force will be more easily dispersed to the bottom plate 131 through the force dispersal member 500.

In the present embodiment, a filler material 900 is selected to fill in the second gap 720, wherein the elasticity of the filler material 900 is greater than the elasticity of the force dispersal member 500. The filler material 900 has the effect of decorating the appearance while preventing dust or liquids from entering the device from the second gap 720. In addition, the filler material 900 also has the effect of being a buffer for the external force to decrease the chances of the top plate inner surface 113 colliding with the top surface 311 when under pressure. Furthermore, since the elasticity of the filler material 900 is greater than the elasticity of the force dispersal member 500, the filler material 900 can be ensured to deform before the force dispersal member 500 changes shapes when the top plate 111 sustains the external force in order to allow the external force to be conducted or transferred to the bottom plate 131 through the force dispersal member 500.

Figure 8:
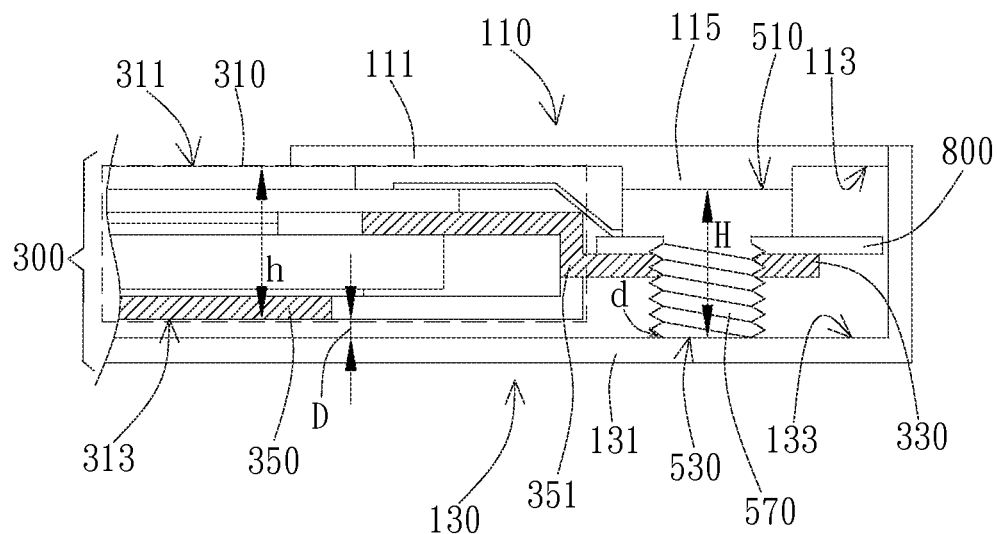
FIG. 8 is a cross-sectional view of another embodiment of the display device.

In the embodiment shown in FIG. 8, a protrusion portion 115 is disposed on the top plate inner surface 113 corresponding to a contact position with the top end 510 of the force dispersal member 500, wherein he protrusion portion 115 contacts against the top end 510. Through this design, when the top end 510 is flush with the top surface 311 of the body 310 or is recessed down relative to the top surface 311, a force conduit or channel may be effectively formed to disperse the external force sustained.

Figure 9A:
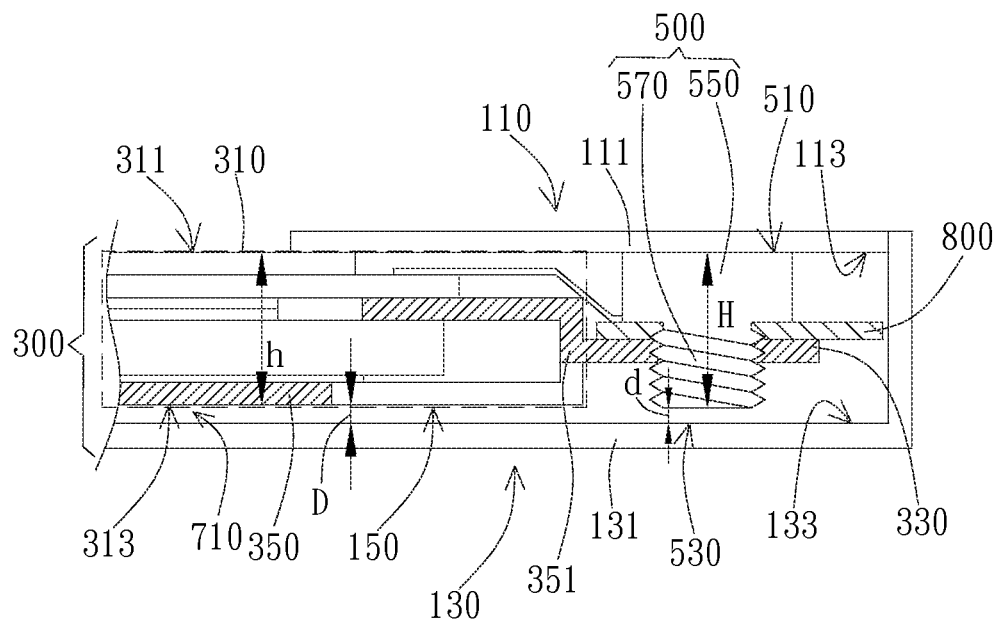
FIG. 9A to 9C are cross-sectional views of the force dispersal member having different lengths.
Figure 9B:
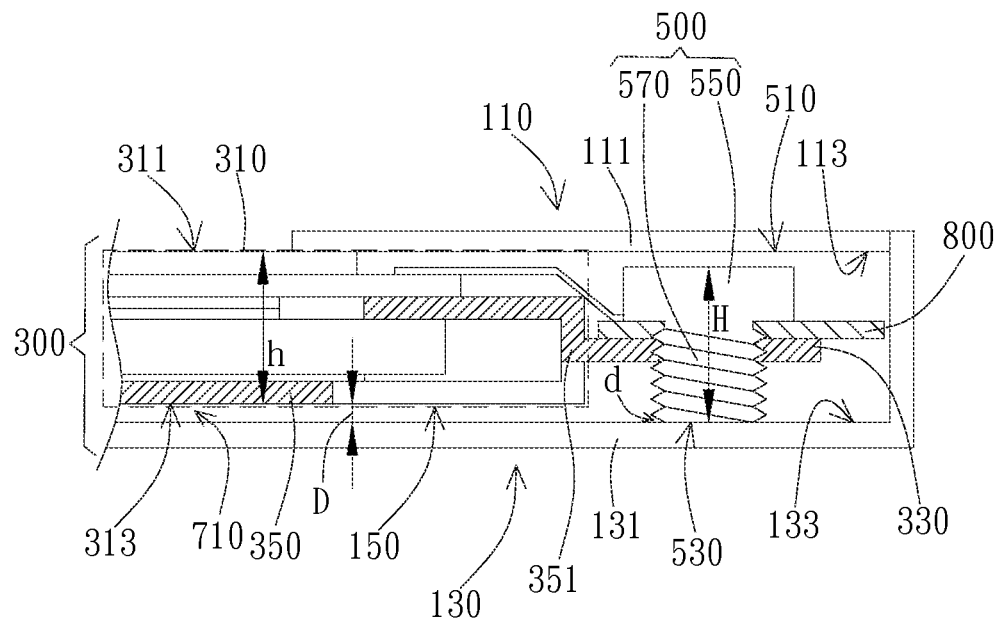
Figure 9C:
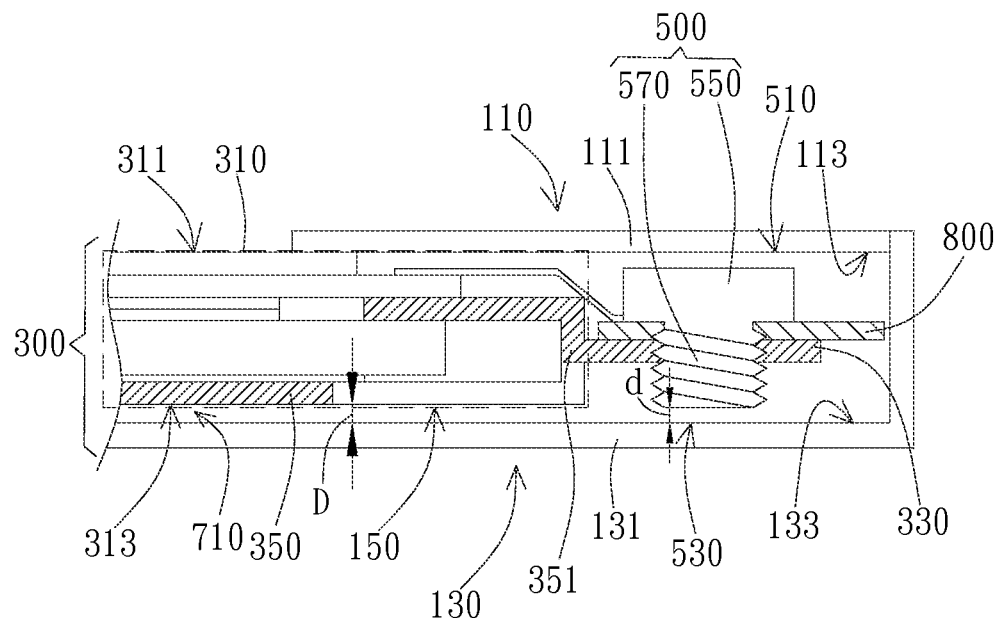

FIGS. 9A to 9C are alternative embodiments of the present invention. As shown in FIG. 9A, the bottom end 530 of the force dispersal member 500 is not in contact with the bottom plate inner surface 133. However, the top end 510 is contacting against the top plate inner surface 113. The vertical distance d from the bottom end 530 to the bottom plate inner surface 133 is not greater than the vertical distance D between the back surface 313 and the bottom plate inner surface 113. In other words, the bottom end 530 is closer to the bottom plate inner surface 113 than the back surface 313. In addition, a vertical distance H between the top end 510 and the bottom end 530 is greater than the vertical distance h between the top surface 311 and the back surface 313. Through this design, when the top plate 111 sustains the external force, the top plate 111 will press down to force the bottom end of the force dispersal member 500 to contact against the bottom plate inner surface 133 and thereby transferring the external force onto the bottom plate 131. Since the bottom end 530 is closer to the bottom plate inner surface 133 than the back surface 313, the external force will not be easily transferred through the body 310 and thus decrease any chances of damages from occurring. If the external force is acted on the body 310, since the body 310 is interlocked in motion with the ledge 330 and the force dispersal member 500 and the bottom end 530 is closer to the bottom plate inner surface 133 than the back surface 313, the bottom end 530 would still contact against the bottom plate inner surface 133 and create a shortcut for the force to travel.

As shown in FIG. 9B, the bottom end 530 of the force dispersal member 500 is contacting against the bottom plate inner surface 133. However, the top end 510 is not in contact with the top plate inner surface 113. In this circumstance, the vertical distance d from the bottom end 530 to the bottom plate inner surface 133 is 0 (zero), which is for certain smaller than the vertical distance D between the back surface 313 and the bottom plate inner surface 133. In addition, the vertical distance H between the top end 510 and the bottom end 530 is greater than the vertical distance h between the top surface 311 and the back surface 313. No matter whether the external force acts on the top plate 111 and is conducted onto the body 310, or whether the external force directly acts on the body 310, since the body 310 is interlocked in motion with the ledge 330 and the force dispersal member 500 and the bottom end 530 directly contacts against the bottom inner surface 113, the bottom end 530 still contacts the bottom plate inner surface 133 first to create a shortcut for force dispersal to decrease the chances of damage to the body 310.

In the embodiment shown in FIG. 9C, the bottom end 530 of the force dispersal member 500 is not in contact with the bottom plate inner surface 133, wherein the top end 510 is also not in contact with the top plate inner surface 113. The vertical distance d from the bottom end 530 to the bottom plate inner surface 133 is no greater than the vertical distance D between the back surface 313 and the bottom plate inner surface 113. In other words, the bottom end 530 is closer to the bottom plate inner surface 113 than the back surface 313. By way of this design, no matter whether the external force acts on the top plate 111 to transfer to the body 310, or whether the external force directly acts on the body 310, since the body 310 is interlocked in motion with the ledge 330 and bottom end 530 is relatively closer to the bottom plate inner surface 113 than the back surface 313, the bottom end 530 will still contact the bottom plate inner surface 133 first to create a shortcut for force dispersal to decrease the chances of damage to the body 310.

Although the embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display device, comprising:
a housing having a top plate and a bottom plate, wherein the top plate has a top plate inner surface and the bottom plate has a bottom plate inner surface facing the top plate inner surface;
a display module disposed on the bottom plate and partially covered by the top plate, the display module including:
a body having corresponding a top surface and a back surface, wherein the back surface faces the bottom plate inner surface, and the body has an outer frame; and
a ledge extending out from an end of the outer frame of the body and positioned between the top plate and the bottom plate; and
a force dispersal member disposed on the ledge and having a top end and a bottom end, the top end facing the top plate inner surface and the bottom end facing the bottom plate inner surface;
wherein a vertical distance between the bottom end and the bottom plate inner surface is not greater than the vertical distance between the back surface and the bottom plate inner surface.

2. The display device of claim 1, wherein the vertical distance between the top end and the bottom end is greater than the vertical distance between the top surface and the back surface.

3. The display device of claim 2, wherein the top end contacts against the top plate inner surface.

4. The display device of claim 3, wherein on a direction of the normal line perpendicular to the top plate inner surface, the top end protrudes a horizontal level of the top surface.

5. The display device of claim 4, wherein the force dispersal member includes a protrusion portion, the protrusion portion includes a substrate and a contact layer, and an elasticity of the contact layer is greater the elasticity of the substrate.

6. The display device of claim 2, wherein the bottom end contacts against the bottom plate inner surface.

7. The display device of claim 1, wherein a first gap is between the back surface and the bottom plate inner surface.

8. The display device of claim 7, further including a circuit board disposed between the top plate and the bottom plate, wherein the rod portion passes through the circuit board to fix the circuit board onto the ledge.

9. The display device of claim 8, wherein the top plate inner surface forms a protrusion at a position corresponding to contacting against the force dispersal member, and the protrusion contacts against the top end.

10. The display device of claim 7, wherein the force dispersal member includes a protrusion portion and a rod portion connected beneath the protrusion portion, the protrusion portion includes a substrate and a contact layer, a bottom portion of the substrate is connected to the rod portion, and the contact layer is disposed on the substrate and contacts against the top plate inner surface.

11. The display device of claim 1, wherein the top end is closer to the top plate inner surface than the top surface.

12. The display device of claim 1, wherein the force dispersal member includes a protrusion portion and a rod portion connected beneath the protrusion portion, the protrusion portion contacts against the top plate inner surface, the rod portion passes through the ledge and contacts against the bottom plate inner surface.

13. The display device of claim 1, further including a filler material, wherein an overlapping portion between the top surface and the top plate inner surface sandwiches a second gap, the filler material fills the second gap and the elasticity of the filler material is greater than the elasticity of the force dispersal member.

14. A display device, comprising:
a housing having a top plate and a bottom plate, wherein the top plate has a top plate inner surface and the bottom plate has a bottom plate inner surface facing the top plate inner surface;
a display module disposed on the bottom plate and partially covered by the top plate, the display module including:
a body having corresponding a top surface and a back surface, wherein the back surface faces the bottom plate inner surface; and
a ledge extending out from an end of the body and positioned between the top plate and the bottom plate; and
a force dispersal member disposed on the ledge and having a top end and a bottom end, the top end facing the top plate inner surface and the bottom end facing the bottom plate inner surface, the force dispersal member has a protrusion portion and a rod portion connected beneath the protrusion portion, the protrusion portion contacts against the top plate inner surface, the rod portion passes through the ledge and contacts against the bottom plate inner surface;
wherein a vertical distance between the bottom end and the bottom plate inner surface is not greater than the vertical distance between the back surface and the bottom plate inner surface.

15. A display device, comprising:
a housing having a top plate and a bottom plate, wherein the top plate has a top plate inner surface and the bottom plate has a bottom plate inner surface facing the top plate inner surface;
a display module disposed on the bottom plate and partially covered by the top plate, the display module including:
a body having corresponding a top surface and a back surface, wherein the back surface faces the bottom inner surface, and a gap is between the back surface and the bottom plate inner surface; and a ledge extending out from an end of the body and positioned between the top plate and the bottom plate;

a force dispersal member disposed on the ledge and having a top end and a bottom end, the top end facing the top plate inner surface and the bottom end facing the bottom plate inner surface; and a circuit board disposed between the top plate and the bottom plate, wherein the protrusion portion presses against the circuit board while the rod portion passes through the circuit board to fix the circuit board onto the ledge;

wherein a vertical distance between the bottom end and the bottom plate inner surface is not greater than the vertical distance between the back surface and the bottom plate inner surface.

16. A display device, comprising:

a housing having a top plate and a bottom plate, wherein the top plate has a top plate inner surface and the bottom plate has a bottom plate inner surface facing the top plate inner surface;

a display module disposed on the bottom plate and partially covered by the top plate, the display module including:

a body having corresponding a top surface and a back surface, wherein the back surface faces the bottom plate inner surface; and a ledge extending out from an end of the body and positioned between the top plate and the bottom plate;

a force dispersal member disposed on the ledge and having a top end and a bottom end, the top end facing the top plate inner surface and the bottom end facing the bottom plate inner surface; and a filler material, wherein an overlapping portion between the top surface and the top plate inner surface sandwiches a second gap, the filler material fills the second gap and the elasticity of the filler material is greater than the elasticity of the force dispersal member;

wherein a vertical distance between the bottom end and the bottom plate inner surface is not greater than the vertical distance between the back surface and the bottom plate inner surface.

* * * * *